「United States Patent [19]

Yamamoto et al.

[11] Patent Number: 5,093,381
[45] Date of Patent: Mar. 3, 1992

[54] RUBBER FOR SPONGE AND RUBBER COMPOSITION FOR SPONGE

[75] Inventors: Keisaku Yamamoto; Hideaki Yamada; Kohichi Iketani, all of Chiba, Japan

[73] Assignee: Sumitomo Chemical Co., Ltd., Osaka, Japan

[21] Appl. No.: 490,852

[22] Filed: Mar. 9, 1990

[30] Foreign Application Priority Data

Mar. 9, 1989 [JP] Japan .................................. 1-58433

[51] Int. Cl.$^5$ ...................... C08L 47/00; C08F 210/12
[52] U.S. Cl. ...................................... 521/140; 521/144
[58] Field of Search ................................ 521/140, 144

[56] References Cited

U.S. PATENT DOCUMENTS

| | | | |
|---|---|---|---|
| 4,252,909 | 2/1981 | Honma et al. | 521/140 |
| 4,311,628 | 1/1982 | Abdou-Sabet et al. | 525/232 |
| 4,490,513 | 12/1984 | Minami et al. | 526/128 |
| 4,728,692 | 3/1988 | Sezaki et al. | 525/232 |
| 4,866,101 | 9/1989 | Iwasa et al. | 521/140 |

FOREIGN PATENT DOCUMENTS 58-57450 12/1983 Japan .

Primary Examiner—John Kight, III
Assistant Examiner—John M. Cooney, Jr.
Attorney, Agent, or Firm—Sughrue, Mion, Zinn Macpeak & Seas

[57] ABSTRACT

A sponge is disclosed, comprising a copolymer of ethylene, an α-olefin, and a diolefin, said copolymer (a) containing the ethylene units and the α-olefin units at a weight ratio of from 73:27 to 40:60, (b) having a Mooney viscosity ($ML_{1+4}121°$ C.) of from 135 to 200, and (c) containing the diolefin units giving an iodine value of from 10 to 36.

A sponge composition is also disclosed, comprising 100 parts by weight of the aforesaid copolymer and from 30 to 130 parts by weight of a plasticizer.

12 Claims, No Drawings

5,093,381

RUBBER FOR SPONGE AND RUBBER COMPOSITION FOR SPONGE

FIELD OF THE INVENTION

The present invention relates to a sponge rubber having excellent characteristics such as prolonged compression set, hysteresis loss, sealing performance, softness, low-temperature properties, workability, and external appearance. The present invention also relates to a rubber composition employing the above sponge rubber. The sponge rubber according to the present invention is useful in a variety of application fields such as sealing materials for automobiles and sealing materials for civil and building construction.

BACKGROUND OF THE INVENTION

Most sponge rubbers used for automobiles and buildings are composed of an ethylene-α-olefin copolymer rubber which is superior in heat resistance, weatherability, workability, and production cost. Such a rubber is extensively popularized particularly in use for door seals, trunk seals, and window seals of automobiles as an indispensable material.

However, as the result of improvements of the performance of automobiles, the performances standard required for sponge rubbers have become higher, so that rubbers produced by the conventional techniques are not sufficient to meet all the required stringent standards.

Specifically, the problems of invasion, into a car interior, of engine noise, air-friction noise around doors, and squeaking noise of tires, leaking of rain, and other problems at high speed driving are dependent greatly upon sealing around the doors; and, therefore, the requirements for sealing performance of sponge rubbers are becoming more severe.

The door sealing sponge rubber, which is kept compressed for a long time when the doors are closed as a sealing material between a door and a car body, ideally should exhibit reduced settling under compression. The settling due to compression is generally expressed quantitatively in terms of compression set. Sealing sponge rubbers are desired to exhibit a smaller value of this compression set.

In addition to the settling, the vibration of doors at high speed driving must be taken into account. Since the vibration frequency of the door will increase with the increase in driving speed of an automobile, sealing rubbers sponge should be capable of following up sufficiently the vibration of the door.

If the sealing sponge rubbers cannot follow up the vibration of the door, a gap is formed between the door and the car body, causing the invasion of the above-mentioned various noises into the car interior. Such follow-up ability can be quantified generally by measuring hysteresis loss. The sponge rubber is desired to exhibit smaller hysteresis losses.

Furthermore, the doors should be able to be opened and closed smoothly over a broad temperature range from a high temperature to a low temperature, so the sponge rubber must have sufficient softness over a broad temperature range.

In addition to he above-mentioned requirements performance, the sponge rubber is naturally required to have good working characteristics such as kneading processability, extrusion processability, and shape-retaining ability.

To meet such requirements directed to the sponge rubber, there is, for example, known an ethylene-α-olefin copolymer having an ethylene unit content of from 55 to 73 mole % and a Mooney viscosity ($ML_{1+4}121°$ C.) of from 65 to 120 as proposed in JP-B-58-57450. (The term "JP-B" as used herein means an "examined Japanese patent publication".)

In this proposed technique, however, the sponge rubber is unsatisfactory in compression set, hysteresis loss, and softness, even though it is satisfactory in green strength and shape-retention.

SUMMARY OF THE INVENTION

An object of the present invention is to provide a sponge rubber producing having superior characteristics in compression set, hysteresis loss, and softness, and exhibiting superior workability in comparison with rubbers produced by conventional techniques.

Another object of the present invention is to provide a rubber composition employing the above-mentioned rubber.

According to an aspect of the present invention, there is provided a rubber comprising a copolymer of ethylene, an α-olefin, and a diolefin, said copolymer (a) containing the ethylene units and the α-olefin units at a weight ratio of from 73:27 to 40:60, (b) having a Mooney viscosity ($ML_{1+4}121°$ C.) of from 135 to 200, and (c) containing the diolefin units giving an iodine value of from 10 to 36.

According to another aspect of the present invention, there is provided a rubber composition comprising 100 parts by weight of a copolymer of ethylene, an α-olefin, and a diolefin, and from 30 to 130 parts by weight of a plasticizer, said copolymer (a) containing the ethylene units and the α-olefin units at a weight ratio of from 73:27 to 40:60, (b) having a Mooney viscosity ($ML_{1+4}121°$ C.) of from 135 to 200, and (c) containing the diolefin units giving an iodine value of from 10 to 36.

DETAILED DESCRIPTION OF THE INVENTION

The sponge rubber of the present invention comprises a copolymer of ethylene, an α-olefin, and a diolefin, satisfying the above-mentioned requirements (a), (b), and (c) (hereinafter simply referred to as "copolymer").

The α-olefins used in the present invention include propylene, butene-1, 4-methylpentene-1, hexene-1, and octene-1, of which propylene is preferable.

The weight ratio of the ethylene units to the α-olefin units is from 73:27 to 40:60, preferably from 67:33 to 45:55. An ethylene unit content higher than 73% causes extreme deterioration in compression set at a low temperature, impairing significantly the recovery properties of the sponge rubber, thus being unsuitable for sealing materials. On the contrary, an ethylene unit content of lower than 40% causes insufficient dispersion of a reinforcing agent such as carbon black and an inorganic filler, thereby roughening the surface of the sponge rubber.

The diolefins employed in the present invention include 1,4-pentadiene, 1,4-hexadiene, divinylbenzene, dicyclopentadiene, methylenenorbornene, ethylidenenorbornene, and vinylnorbornene, of which ethylidenenorbornene is particularly preferable.

The content of the diolefin in the copolymer is, in terms of the iodine value, in the range of from 10 to 36, preferably from 12 to 32. An iodine value of less than 10 increases the compression set. Moreover, it lowers the vulcanization rate, requiring a larger amount of vulcanization accelerating agent, which causes blooming.

On the contrary, an iodine value of more than 36 increases the hysteresis loss, increasing the hardness of the sponge rubber, and raising the production cost.

The Mooney viscosity ($ML_{1+4}121°$ C.) is in the range of from 135 to 200, preferably 140 to 180. The Mooney viscosity of less than 135 deteriorates the characteristics of the compression set and hysteresis loss of the sponge rubber.

On the other hand, the Mooney viscosity of more than 200 impairs kneading processability, causing formation of coagulation lumps, and additionally surface roughening and edge defect, etc. of extrusion molded articles, even though the compression set and hysteresis loss are ameliorated. Therefore, such compositions are not suitable for practical applications.

The copolymer of the present invention can be manufactured by a well known processes. That is, the copolymer can be manufactured by feeding ethylene, an α-olefin, and a diolefin, and additionally a molecular weight modifier such as a hydrogen gas into a reaction medium in the presence of a Ziegler catalyst such as a soluble vanadium compound and an organoaluminum compound.

The reaction media include aliphatic hydrocarbons such as pentane, hexane, heptane, octane, and kerosene; alicyclic hydrocarbons such as cyclohexane; aromatic hydrocarbons such as benzene, toluene, and xylene; and halogenated hydrocarbons such as chlorobenzene, carbon tetrachloride, tetrachloroethylene, trichloroethylene, ethyl chloride, methylene chloride, and dichlororethane; or mixtures thereof.

The soluble vanadium compound is exemplified by vanadium tetrachloride, vanadyl trichloride, vanadium triacetylacetonate, vanadyl diacetylacetonate, vanadyl trialkoxides represented by $VO(OR)_3$ (wherein R is an aliphatic hydrocarbon radical), halogenated vanadyl alkoxides represented by $VO(OR)_n X_{3-n}$ (wherein R is an aliphatic hydrocarbon radical, X is a halogen atom, and $0 < n < 3$), or mixtures thereof.

The organoaluminum compounds include compounds represented by $R_m AlX_{3-m}$ (wherein R is an aliphatic hydrocarbon radical, X is a halogen atom, and $1 \leq m \leq 3$) such as triethylaluminum, diethylaluminum chloride, ethylaluminum sesquichloride, and ethylaluminum dichloride, or mixtures thereof.

The sponge rubber composition of the present invention is characterized by incorporation of from 30 to 130 parts by weight of a plasticizer as the essential component per 100 parts by weight of the copolymer of the present invention. Further, additives may be added thereto such as a foaming agent, a vulcanizing agent, a vulcanization accelerator, a vulcanization aid, and a filler.

The plasticizers employed in the present invention may be those usually used for rubber and include process oils, lubricating oils, paraffins, liquid paraffins, petroleum asphalt, vaseline, coal tar pitch, caster oil, linseed oil, factice, beeswax, recinoleic acid, palmitic acid, barium stearate, calcium stearate, zinc laurate, atactic polypropylene, and coumarone-indene resins, of which process oils are preferable. The plasticizer is used in an amount of from 30 to 130 parts by weight, preferably from 50 to 130 parts by weight, more preferably from 70 to 130 parts by weight, per 100 parts by weight of the copolymer.

The use of the plasticizer within such a range makes feasible the manufacture of a soft sponge rubber without impairing the processability at kneading or shape-retaining property.

The vulcanizing agents which may be used in the present invention include sulfur, sulfur chloride, sulfur dichloride, morpholine disulfide, alkylphenol disulfides, tetramethylthiuram disulfide, selenium dimethyldithiocarbamate, dicumyl peroxide, 2,5-dimethyl-2,5-di(t-butylperoxy)hexane, 2,5-dimethyl-2,5-di(benzoylperoxy)hexane, 2,5-dimethyl-2,5-di(t-butylperoxy)hexyne-3, di-t-butyl peroxide, di-t-butylperoxy-3,3,5-trimethylcyclohexane, and t-butyl hydroperoxide. Among these agents, dicumyl peroxide, di-t-butyl peroxide, and di-t-butylperoxy-3,3,5-trimethylcyclohexane are particularly preferable.

The sulfur is used usually in an amount of from 0.1 to 10 parts by weight, preferably from 0.5 to 5 parts by weight per 100 parts by weight of the copolymer. The organic peroxide is normally used in an amount of from 0.1 to 15 parts by weight, preferably from 0.5 to 8 parts by weight per 100 parts by weight of the copolymer.

In the case where sulfur or a sulfur type compound is used as the vulcanizating agent, a vulcanization accelerator or a vulcanization aid may be used additionally, if desired.

The vulcanization accelerators include N-cyclohexyl-2-benzothiazole-sulfenamide, N-oxydiethylene-2-benzothiazole-sulfenamide, N,N-diisopropyl-2-benzothiazole-sulfenamide, 2-mercaptobenzothiazole, 2-(2,4-dinitrophenyl)mercaptobenzothiazole, 2-(2,6-diethyl-4-morpholinothio)benzothiazole, dibenzothiazyl disulfide, diphenylguanidine, triphenylguanidine, di-o-tolylguanidine, o-tolylbiguanide, diphenylguanidine phthalate, reaction products of acetaldehyde and aniline, condensates of butylaldehyde and aniline, hexamethylenetetramine, acetaldhyde ammonia, 2-mercaptoimidazoline, thiocarbanilide, diethylthiourea, dibutylthiourea, trimethylthiourea, di-o-tolylthiourea, tetramethylthiuram monosulfide, tetramethylthiuram disulfide, tetraethylthiuram disulfide, tetrabutylthiuram disulfide, pentamethylenethiuram tetrasulfide, zinc dimethyldithiocarbamate, zinc diethylthiocarbamate, zinc di-n-butyldithiocarbamate, zinc ethylphenyldithiocarbamate, zinc butylphenyldithiocarbamate, sodium dimethyldithiocarbamate, selenium dimethyldithiocarbamate, tellurium diethyldithiocarbamate, and zinc dibutylxanthogenate. Such a vulcanization accelerator is used in an amount of from 0.1 to 20 parts by weight, preferably 0.2 to 10 parts by weight per 100 parts by weight of the copolymer.

The vulcanization aids include metal oxides such as magnesium oxide and zinc white, of which zinc white is preferable. Usually, the vulcanization aid is used in an amount of from 3 to 20 parts by weight per 100 parts by weight of the copolymer.

In crosslinking with a peroxide, a crosslinking aid may be used such as sulfur, quinone dioximes such as p-quinone dioxime, polyethylene glycol dimethacrylate, diallyl phthalate, triallyl cyanurate, and divinylbenzene.

The fillers employed in the present invention are preferably inorganic fillers used ordinarily for rubber, including carbon black such as SRF, GPF, FEF, HAF, ISAF, SAF, FT, and MT; fine silicate powder, calcium carbonate, talc, and clay.

The foaming agents employed in the present invention include sodium bicarbonate, sodium carbonate, ammonium bicarbonate, ammonium carbonate, ammonium nitrite, N,N'-dimethyl-N,N'-dinitron terephthalamide, N,N'-dinitron pentamethylenetetramine, azodicarbonamide, azobisisobutyronitrile, azocyclohexylnitrile, azodiaminobenzene, barium azodicarboxylate, benzenesulfonyl hydrazide, toluenesulfonyl hydrazide, p,p'-oxybis-(benzenesulfonyl hydrazide), diphenylsulfone-3,3'-disulfonyl hydrazide, calcium azide, 4,4'-diphenyldisulfonyl azide, and p-toluenesulfonyl azide. The foaming agent is incorporated in an amount of from 0.5 to 30 parts by weight, preferably from 1 to 15 parts by weight per 100 parts by weight of the copolymer.

A foaming aid may be used in combination with the foaming agent, if desired.

As a rubber component of the foam, other rubbers or ethylene-α-olefin-diolefin copolymers may be used in combination with the copolymer of the present invention.

In the present invention, a known kneader, extruder, or foaming machine may be employed.

The copolymer of the present invention is processed together with the above-mentioned additives into the rubber composition for sponges by means of an open roll mill, a Banbury mixer, a kneader, or the like; and, subsequently, the composition is foamed and crosslinked at the proper temperature.

A feature of the present invention resides in a specified Mooney viscosity range within which the compression set and hysteresis loss, as well as kneading processability and extrusion processability, are satisfactory. This is based on the finding regarding the significant dependence of the compression set and hysteresis loss on the Mooney viscosity; a higher Mooney viscosity is preferable to optimize these properties.

Another feature of the present invention resides in a specified iodine value range within which both of the compression set and hysteresis loss are satisfactory. This is based on the finding that the iodine value greatly affects both of the compression set and hysteresis loss and that the iodine value affects the above two characteristics in opposite directions.

A further feature of the present invention resides in the relatively high Mooney viscosity range of the copolymer, which makes feasible the manufacture of a soft sponge rubber which could not be achieved by conventional techniques. In extrusion of a mixture consisting of the copolymer, carbon black, inorganic filler, plasticizer, etc. (hereinafter referred to as "compound") by means of an extruder, an excessively low Mooney viscosity of the compound deteriorates the shape-retaining properties of the compound. On the other hand, an excessively high Mooney viscosity imposes a high load on the extruder, causing troubles in a production line. In addition, an excessively high Mooney viscosity results in increased hardness of the foamed sponge rubber, which causes loss of the softness thereof, even though the shape-retaining property is improved. Therefore, the Mooney viscosity of the compound must be controlled within a suitable range ($ML_{1+4}100°$ C. of 30 to 60).

In order to provide a compound of a suitable Mooney viscosity, the copolymer rubber of the present invention, which has a higher Mooney viscosity than conventional rubbers, can be blended with a relatively large amount of the plasticizer without impairing the aforementioned shape-retaining properties. A sponge rubber made from such a compound will have greater softness.

The examples below are intended to explain specifically the present invention without thereby limiting it in any way.

EXAMPLES 1 TO 5 AND COMPARATIVE EXAMPLES 1 TO 6

A copolymer, Seast ® SO, Seast ® S, zinc white, and stearic acid shown in Table 1 were kneaded with a plasticizer shown in Table 2 by means of a BR type Banbury mixer (volume: 1.5 liters), and subsequently other additives shown in Table 1 were added thereto by means of 8-inch open rolls to prepare a compound.

The compound was extruded and molded into a tube by means of a 45-mm$\phi$ extruder provided with a tubular die (inside diameter: 10 mm, wall thickness: 1.5 mm) at a die temperature of 80° C. and a cylinder temperature of 60° C. The surface smoothness of the extruded article was visually evaluated from the external appearance of the extruded tube. The molded article was heated in a hot-air vulcanization chamber for 5 minutes to give a tubular sponge rubber. The specific weight of the sponge rubber was determined, with a test specimen cut in 50-mm length, from the ratio of (weight)/(volume), the weight being measured in the air and the volume being measured from the buoyancy in water.

The compression set was determined with the specimen of the tubular sponge rubber cut in 20-mm length. The specimen was compressed by 50% of the outer diameter of the tube in a measuring mold for compression set for sponge and subjected to heat treatment in a Geer oven at 70° C. for 100 hours. The test was conducted according to SRIS-0101 (physical test of expanded rubber).

The hysteresis loss was determined with the test specimen prepared by cutting the tubular sponge rubber in a length direction into a flat sheet and die-cutting it with a JIS No. 3 dumbbell die. The hysteresis loss was determined from the S-S curve obtained with a Strograph in such a manner that the specimen was stretched by 100% at a rate of 500 mm/min. and returned to the original state at the same rate.

An index of softness, namely the compression stress; was determined by using a specimen prepared by cutting the tube in a 50-mm length and measuring the stress of the specimen at 50% compression of the outer diameter of the tube by means of the Strograph.

The results are shown in Table 2.

In Examples 1 to 5 satisfying the requirements of the present invention, all the specimens had superior characteristics in all of compression set, hysteresis loss, compression stress, and surface smoothness. On the contrary, in Comparative Examples 1 to 4 in which the Mooney viscosity of the copolymer is lower than the specified value of the present invention, the specimens were not satisfactory in compression set, hysteresis loss, compression stress, etc. In Comparative Example 5, in which the Mooney viscosity of the copolymer was higher than the specified value of the present invention and consequently a larger amount of a plasticizer had to be incorporated than the specified amount of the present invention, the specimen was inferior in surface smoothness. In Comparative Example 6 in which the iodine value of the copolymer was lower than the specified value of the present invention, the specimen was inferior in compression set. The sponge rubbers of these Comparative Examples are not suitable for the object of the present invention.

TABLE 1

|  |  | Blending ratio (weight parts) |
|---|---|---|
| Copolymer | 1) | 100 |
| Seast ® SO | 2) | 50 |
| Seast ® S | 3) | 50 |
| Zinc white |  | 5 |
| Stearic acid |  | 1 |
| Vinyfor ® AC#3 | 4) | 4 |
| Cellpaste ® 101 | 5) | 2 |
| Soxinol ® PZ | 6) | 1 |
| Soxinol ® TRA | 7) | 1.5 |
| Soxinol ® M | 8) | 1.5 |
| Soxinol ® EZ | 9) | 1.5 |
| Sulfur |  | 1.2 |

1) Copolymer: Ethylene-propylene-ethylidenenorbornene copolymer
2) Carbon black made by Tokai Carbon Co., Ltd.
3) Carbon black made by Tokai Carbon Co., Ltd.
4) Azodicarbonamide as foaming agent made by Eiwa Chemical Ind. Co., Ltd.
5) Urea as foaming agent made by Eiwa Chemical Ind. Co., Ltd.
6) Zinc dimethyldithiocarbamate made by Sumitomo Chemical Co., Ltd.
7) Dipentamethylenethiuram hexasulfide made by Sumitomo Chemical Co., Ltd.
8) Mercaptobenzothiazole made by Sumitomo Chemical Co., Ltd.
9) Zinc diethyldithiocarbamate made by Sumitomo Chemical Co., Ltd.

TABLE 2

|  | Example | | | | | Comparative Example | | | | | |
|---|---|---|---|---|---|---|---|---|---|---|---|
|  | 1 | 2 | 3 | 4 | 5 | 1 | 2 | 3 | 4 | 5 | 6 |
| Structure of copolymer 1) | | | | | | | | | | | |
| $ML_{1+4}$ 121° C. | 141 | 165 | 144 | 138 | 135 | 55 | 83 | 105 | 124 | 210 | 143 |
| Ratio of propylene (% by weight) | 40 | 40 | 30 | 40 | 44 | 40 | 40 | 40 | 40 | 40 | 40 |
| Iodine value | 22 | 22 | 22 | 13 | 30 | 22 | 22 | 22 | 22 | 22 | 8 |
| Plasticizer content (PHR) 10) | 95 | 103 | 95 | 95 | 95 | 52 | 60 | 70 | 90 | 122 | 95 |
| Mooney viscosity of compound $ML_{1+4}$ 100° C. | 46 | 44 | 45 | 43 | 44 | 42 | 42 | 43 | 43 | 46 | 46 |
| Specific gravity of sponge rubber | 0.50 | 0.52 | 0.53 | 0.51 | 0.51 | 0.53 | 0.50 | 0.51 | 0.50 | 0.50 | 0.49 |
| Compression set (%) | 16.8 | 16.0 | 17.2 | 20.3 | 15.1 | 28.8 | 26.4 | 23.2 | 18.2 | 15.1 | 25.7 |
| Hysteresis loss (%) | 35 | 32 | 35 | 32 | 38 | 45 | 41 | 38 | 36 | 30 | 30 |
| Compression stress (kgf/5 cm) | 0.72 | 0.65 | 0.83 | 0.68 | 0.95 | 1.21 | 0.99 | 0.88 | 0.81 | 0.68 | 0.69 |
| Surface smoothness of extruded article | good | good | good | good | good | good | good | good | good | poor | good |

10) Diana ® PW-90, made by Idemitsu Kosan Co., Ltd. (PHR) Parts by weight per 100 parts by weight of the copolymer As described above, the present invention provides a rubber for sponge and a rubber composition for sponge which has superior characteristics such as compression stress, compression set, and hysteresis loss and has excellent external appearance, and further exhibits superior workability.

While the invention has been described in detail and with reference to specific embodiments thereof, it will be apparent to one skilled in the art that various changes and modifications can be made therein without departing from the spirit and scope thereof.

What is claimed is:

1. A sponge rubber comprising a copolymer of ethylene, an α-olefin, and a diolefin, said copolymer (a) containing the ethylene units and the α-olefin units at a weight ratio of from 73:27 to 40:60, (b) having a Mooney viscosity ($ML_{1+4}$121° C.) of from 135 to 200, and (c) containing the diolefin units giving an iodine value of from 10 to 36.

2. A sponge rubber according to claim 1, wherein said diolefin is ethylidenenorbornene.

3. A sponge rubber according to claim 1, wherein said copolymer contains the ethylene units and the α-olefin units at a weight ratio of from 67:33 to 45:55.

4. A sponge rubber according to claim 1, wherein said copolymer contains the diolefin units giving an iodine value of from 12 to 32.

5. A sponge rubber according to claim 1, wherein said copolymer has a Mooney viscosity ($ML_{1+4}$121° C.) of from 140 to 180.

6. A sponge rubber composition comprising 100 parts by weight of a copolymer of ethylene, an α-olefin, and a diolefin, said copolymer (a) containing the ethylene units and the α-olefin units at a weight ratio of from 73:27 to 40:60, (b) having a Mooney viscosity ($ML_{1+4}$121° C.) of from 135 to 200, and (c) containing the diolefin units giving an iodine value of from 10 to 36; and from 30 to 130 parts by weight of a plasticizer.

7. A sponge rubber composition according to claim 6, wherein said diolefin is ethylidenenorbornene.

8. A sponge rubber composition according to claim 6, wherein said copolymer contains the ethylene units and the α-olefin units at a weight ratio of from 67:33 to 45:55.

9. A sponge rubber composition according to claim 6, wherein said copolymer contains the diolefin units giving an iodine value of from 12 to 32.

10. A sponge rubber composition according to claim 6, wherein said copolymer has a Mooney viscosity ($ML_{1+4}$121° C.) of from 140 to 180.

11. A sponge rubber composition according to claim 6, wherein said plasticizer is present in an amount of from 50 to 130 parts by weight per 100 parts by weight of said copolymer.

12. A sponge rubber composition according to claim 11, wherein said plasticizer is present in an amount of from 70 to 130 parts by weight per 100 parts by weight of said copolymer.

* * * * *